United States Patent
Yu et al.

(10) Patent No.: US 9,133,293 B2
(45) Date of Patent: Sep. 15, 2015

(54) COPOLYMER RUBBER HAVING A STAR-SHAPED BLOCK STRUCTURE, THE PREPARATION PROCESS AND USE THEREOF

(75) Inventors: Guozhu Yu, Beijing (CN); Lin Xu, Beijing (CN); Xinhe Kang, Beijing (CN); Nini Wang, Beijing (CN); Hui Liu, Beijing (CN); Chuanqing Li, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 608 days.

(21) Appl. No.: 13/169,852

(22) Filed: Jun. 27, 2011

(65) Prior Publication Data

US 2011/0319568 A1 Dec. 29, 2011

(30) Foreign Application Priority Data

Jun. 25, 2010 (CN) .......................... 2010 1 0219627

(51) Int. Cl.
*C08F 2/00* (2006.01)
*C08F 299/00* (2006.01)
*C08J 5/14* (2006.01)
*C08F 297/04* (2006.01)
*B60C 1/00* (2006.01)

(52) U.S. Cl.
CPC ........... *C08F 297/044* (2013.01); *B60C 1/0016* (2013.04)

(58) Field of Classification Search
CPC . C08F 297/04; C08F 297/044; C08F 297/046
USPC ............. 525/88, 271, 272, 314, 332.1, 332.9, 525/333.3, 901
See application file for complete search history.

(56) References Cited

U.S. PATENT DOCUMENTS

| | | | |
|---|---|---|---|
| 5,070,148 A | 12/1991 | Hsu et al. | |
| 5,100,967 A * | 3/1992 | Wolpers et al. | ............... 525/314 |
| 5,239,009 A | 8/1993 | Halasa et al. | |
| 5,272,220 A | 12/1993 | Rodgers et al. | |
| 5,616,653 A | 4/1997 | Hsu et al. | |
| 7,045,578 B2 * | 5/2006 | Karato et al. | .............. 525/331.9 |
| 2002/0120069 A1 * | 8/2002 | Li et al. | ......................... 525/314 |

FOREIGN PATENT DOCUMENTS

| | | |
|---|---|---|
| CN | 1509297 A | 6/2004 |
| EP | 0 818 478 B1 | 8/2004 |
| WO | WO 96/30419 | 10/1996 |

OTHER PUBLICATIONS

English Abstract for CN 1509297A.
Nordsiek, "The 'Integral Rubber' Concept—an Approach to an Ideal Tire Tread Rubber", *Kautschuk, Gummi Kunststoffe*, 1985, 38(3): pp. 178-185.

* cited by examiner

*Primary Examiner* — Irina S Zemel
*Assistant Examiner* — Jeffrey Lehihan
(74) *Attorney, Agent, or Firm* — Finnegan, Henderson, Farabow, Garrett & Dunner LLP

(57) ABSTRACT

Provided is a copolymer rubber, comprising a copolymer having a star-shaped block structure $(SIB-PA)_n-X$, wherein SIB is a block comprising styrene, butadiene, and isoprene as constituent monomers; PA is a block comprising butadiene or isoprene as a constituent monomer; X is the residue of at least one coupling agent; and n=2-4. Also provided is a process for preparing the copolymer rubber and use thereof.

13 Claims, No Drawings

COPOLYMER RUBBER HAVING A STAR-SHAPED BLOCK STRUCTURE, THE PREPARATION PROCESS AND USE THEREOF

This application claims benefit of priority under 35 U.S.C. §119 to Chinese patent application No. 201010219627.8, filed on Jun. 25, 2010.

Disclosed herein is a copolymer rubber comprising a copolymer having a star-shaped block structure, wherein the copolymer comprises styrene, isoprene and butadiene as the constituent monomers. Also disclosed herein is the preparation process and use thereof. The copolymer rubber disclosed herein can have a low rolling resistance, an excellent wet skid resistance, as well as desirable physical and mechanical properties, and can be widely applied in the rubber product field such as tire tread rubber and the like.

As the modern automobile industry develops, the expectation for better tire performance become higher and higher. High speed, safety, comfort, and energy conservation become the basic requirements. For this, the study on the properties of rubber materials can focus on aspects such as rolling loss, wet skid resistance, and abrasion resistance. For a rubber material, on the one hand, a higher wet skid resistance may be desired; on the other hand, a lower rolling resistance may also be desired. Meanwhile, an excellent abrasion resistance can also be desired. Moreover, in the balance, it is desired that the improvement of one property not necessarily negatively affect other desired properties. Among various general-purpose rubbers presently used, such as cis-1,4-polybutadiene rubber (BR), natural rubber (NR), emulsion polymerized styrene butadiene rubber (ESBR) and solution-polymerized styrene butadiene rubber (SSBR), cis-1,4-polybutadiene rubber may have the greatest flexibility, good abrasion resistance, small rolling resistance, yet very poor wet skid resistance. Natural rubber may have the moderate flexibility, relatively good abrasion resistance and rolling resistance, yet so-so wet skid resistance. Styrene butadiene rubber may have an excellent wet skid resistance, yet poor abrasion resistance, and big rolling resistance. Thus it can be seen that among the various general-purpose rubbers as presently used, any single rubber may not achieve an ideal balance among various desired properties. According to the known literature, the wet skid resistance of rubber can be, for example, indirectly characterized by the tan δ value of rubber as measured at 0° C. in the dynamic mechanical performance test; for example, samples having a tan δ value of 0.24 or above at 0° C. may have a relatively good wet skid resistance. Also, the rolling resistance can be, for example, represented by the tan δ value of rubber as measured at 60° C.; for example, samples having a tan δ value of 0.12 or below at 60° C. may have a relatively good rolling resistance property.

To achieve better balance among the desired properties of rubber, Nordsiek almost thirty years ago proposed the concept of "integral rubber" (see K. H. Nordsiek, The "integral rubber" concept-an approach to an ideal tire tread rubber, Kautschuk, Gummi Kunststoffe, 1985, 38 (3) : 178-185). Such rubber could achieve a better balance among the desired properties of rubber. Therefore, many institutions of scientific research have investigated "integral rubbers," hoping to discover rubber materials having improved low rolling resistance and high wet skid resistance. See, e.g., U.S. Pat. Nos. 5,070,148 and 5,239,009.

Provided herein is a copolymer rubber, comprising a copolymer having a star-shaped block structure $(SIB-PA)_n$-X, wherein:

SIB is a block comprising styrene, butadiene, and isoprene as constituent monomers;
PA is a block comprising butadiene or isoprene as a constituent monomer;
X is a residue of at least one coupling agent; and
n=2-4.

Such a copolymer rubber may have a low rolling resistance, an excellent wet skid resistance, and desirable physical mechanical properties, which can make it widely applicable in the rubber product field such as tire tread rubber and the like.

In some embodiments, the content of isoprene may range from 5 to 85%, such as from 20 to 60%, by weight, relative to the total weight of the copolymer rubber disclosed herein.

In some embodiments, the content of butadiene may range from 5 to 85%, such as from 20 to 60%, by weight, relative to the total weight of the copolymer rubber disclosed herein.

In some embodiments, the content of styrene may range from 10 to 40%, such as from 15 to 25%, by weight, relative to the total weight of the copolymer rubber disclosed herein.

In some embodiments, the structure SIB-PA, before being coupled to the at least one coupling agent (source of the residue X), has a number average molecular weight ranging from 100,000 to 500,000, such as from 120,000 to 250,000, and has a polydispersity index ranging from 1.1 to 2.5.

In some embodiments, the SIB is a block formed by random copolymerization of styrene, butadiene, and isoprene.

In some embodiments, the PA is a block formed by homopolymerization of butadiene or isoprene.

In some embodiments, the copolymer rubber may further comprise a copolymer having a SIB-PA structure, wherein SIB is a block comprising styrene, butadiene, and isoprene as constituent monomers, and PA is a block comprising butadiene or isoprene as a constituent monomer.

In some embodiments, the content of isoprene by the 1,4-isoprene linkage may range from 10 to 40%, such as from 20-30%, by weight, relative to the total weight of the copolymer rubber disclosed herein; and the content of isoprene by 3,4-isoprene linkage may range from 5 to 30%, such as from 10 to 20%, by weight, relative to the total weight of the copolymer rubber disclosed herein.

In some embodiments, the content of butadiene by 1,2-butadiene linkage ranges from 5 to 30%, such as from 10 to 20%, by weight relative to the total weight of the copolymer rubber disclosed herein; and the content of butadiene by 1,4-butadiene linkage ranges from 10 to 40%, such as from 20 to 30%, by weight relative to the total weight of the copolymer rubber disclosed herein. The high content of isoprene by 3,4-isoprene linkage and of butadiene by 1,2-butadiene linkage may result in an improved wet skid resistance property of the copolymer rubber.

In some embodiments, the content of butadiene or isoprene in the SIB block may range from 6 to 40%, such as from 25 to 37.5%, by weight, relative to the total weight of the copolymer rubber disclosed herein.

In some embodiments, the content of styrene microblock is equal to or less than 1% by weight, relative to the total weight of the copolymer rubber. As disclosed herein, the term "styrene microblock" means a block with a number of repeating styrene units ranging from 3 to 5. Low styrene microblock content may result in improved rolling resistance property of the copolymer rubber provided herein.

In some embodiments, the copolymer rubber may have a glass transition temperature (Tg) ranging from −30 to −80° C., such as from −35 to −50° C.

In some embodiments, the copolymer rubber has a tan δ value of equal to or less than 0.12 at 60° C., and a tan δ value of equal to or larger than 0.24 at 0° C.

Also provided herein is a process for preparation of the copolymer rubber disclosed herein, comprising:

(a) initiating polymerization of at least three monomers of styrene, butadiene and isoprene in a certain proportion with at least one organic lithium initiator in at least one non-polar hydrocarbon solvent and in the presence of at least one polar modifier;

(b) after a period of time, adding at least one additional monomer chosen from butadiene and isoprene;

(c) adding at least one coupling agent for coupling;

(d) after a period of time, adding at least one terminator to terminate the polymerization reaction.

In some embodiments, the addition of at least one additional monomer referred to in step (b) is conducted after the completion of polymerization of step (a)

In some embodiments, at the end of step (a), a block SIB randomly comprising styrene, butadiene, and isoprene as the constituent monomers is obtained.

In some embodiments, the block SIB obtained at the end of step (a) randomly consists of styrene, butadiene, and isoprene as the constituent monomers.

In some embodiments, a product having the structure SIB-PA is formed at the end of step (b), wherein SIB is a block randomly consisting of styrene, butadiene, and isoprene as constituent monomers, and PA is a block consisting of butadiene or isoprene as constituent monomer.

In some embodiments, a copolymer having a star-shaped block structure $(SIB-PA)_n-X$ is obtained at the end of step (d), wherein SIB is a block randomly consisting of styrene, butadiene, and isoprene as constituent monomers; PA is a block consisting of butadiene or isoprene as constituent monomer; X is the residue of at least one coupling agent; and n=2-4.

As disclosed herein, in the copolymer having a star-shaped block structure $(SIB-PA)_n$- obtained at the end of step (d), the PA moiety of the SIB-PA structure is linked to the residue X of the at least one coupling agent.

In some embodiments, the at least one non-polar hydrocarbon solvent is selected from alkanes, $C_5$-$C_7$ cycloalkanes, aromatic hydrocarbons, and isoparaffins. For example, the at least one non-polar hydrocarbon solvent is selected from benzene, toluene, hexane, cyclohexane, pentane, and heptane. As for the polymerization of step (a), the at least one non-polar hydrocarbon solvent is present in an amount so that, for example, the concentration of at least one of the monomers used in step (a) may range from 5 to 30%, such as from 8 to 20%, by weight, relative to the total weight of the ingredients and the at least one non-polar hydrocarbon solvent in step (a).

In some embodiments, the at least one organic lithium initiator used in step (a) can be those conventionally employed in the field of anionic polymerization, e.g., organic mono- or di-lithium initiator. For example, the organic mono-lithium initiator can be a compound of formula RLi, wherein R is chosen from linear and branched alkyl, cycloalkyl and aryl groups, e.g., ethyl lithium, propyl lithium, isopropyl lithium, n-butyl lithium, sec-butyl lithium, pentyl lithium, hexyl lithium, cyclohexyl lithium, phenyl lithium, methylphenyl lithium, and naphthyl lithium. In some embodiments, n-butyl lithium or sec-butyl lithium is used as the initiator. The amount of the initiator used in polymerization process depends upon the desired molecular weight of the product SIB-PA obtained in step (b). For example, the amount of the initiator can range from 0.25 to 2.5 mmol per 100 g monomer. For further example, the amount of the alkyl lithium initiator can be sufficient to make the product SIB-PA obtained in step (b) have a number average molecular weight ranging from 100,000 to 500,000, such as from 120,000 to 250,000.

In some embodiments, the initiation of polymerization in step (a) is conducted at a temperature ranging from 35 to 80° C., such as from 40 to 60° C.

In some embodiments, the addition of butadiene or isoprene in step (b) is conducted in such a manner that the polymerization reaction is carried out at a temperature ranging from 60 to 100° C., such as from 70 to 95° C.

In the preparation process as disclosed herein, the polymerization reaction can be conducted at a pressure ranging from 0.05 MPa to 0.5 MPa, such as from 0.1 MPa to 0.3 MPa. The reaction time of each step can be determined by the complete consumption of monomers in polymerization reaction.

In the preparation process as disclosed herein, at least one polar modifier can be added in step (a) as the randomizing agent and structure modifier to ensure the copolymerization reaction of the added monomers, such as styrene, butadiene and isoprene, is conducted in a random manner. The at least one polar modifier can be a conventional reagent in the field of rubber synthesis, chosen, for example, from oxygen-containing, nitrogen-containing, sulfur-containing, and phosphorous-containing compounds. In some embodiments, the at least one polar modifier can be selected from diethyl ether, dibutyl ether, tetrahydrofuran, ethylene glycol dimethyl ether, diethylene glycol dimethyl ether, dioxane, crown ethers, ethyl tetrahydrofurfuryl ether, triethylamine, tetramethyl ethylene diamine, hexamethylphosphoric triamide, potassium tert-butoxide, potassium tert-pentoxide, lauryl potassium, potassium alkylbenzenesulphonate, and sodium alkylbenzenesulphonate. The amount of the at least one polar modifier as disclosed herein is not particularly limited. For example, the amount of the at least one polar modifier used can be defined by a molar ratio of the at least one polar modifier to the at least one organic lithium initiator. The amount of the at least one polar modifier is selected according to the desired values of the 1,2-BD (BD: butadiene) content and 3,4-IP (IP: isoprene) content in the SIB-PA random copolymer. In some embodiments, the molar ratio of the at least one polar modifier to the at least one organic lithium initiator ranges from 0.1:1 to 10:1, such as from 0.2:1 to 2:1.

In the preparation process as disclosed herein, after the completion of the polymerization reaction and before the addition of at least one terminator, at least one coupling agent can be added to couple the resulting active copolymer chains. The amount of the at least one coupling agent shall ensure that the coupling efficiency ranges from 20 to 100%, such as from 40% to 80%. As disclosed herein, the term "coupling efficiency" refers to the proportion of the coupled active copolymer chains relative to the total active copolymer chains. In some embodiments, the at least one coupling agent is selected from multivinyl compounds (such as multivinyl aromatic hydrocarbons), multifunctional epoxides, imines, aldehydes, ketones, anhydrides, esters, isocyanates and halides. For example, the at least one coupling agent can be selected from divinyl benzene, tetravinyl silane, tetrachloro methane, silicon tetrachloride, tin tetrachloride, and dimethyl terephthalate. For further example, the at least one coupling agent is selected from divinyl benzene, silicon tetrachloride, and tin tetrachloride. In some embodiments, the amount of the at least one coupling agent is such that the molar ratio of the at least one coupling agent to the at least one organic lithium initiator ranges from 0.05:1 to 2:1.

After the coupling reaction of the step (c) of the preparation process as disclosed herein is complete, at least one terminator may be used to terminate the polymerization reaction in a manner conventionally employed in the field of anionic polymerization to terminate the active polymer chains. The at least one terminator can be those conventionally employed in the field of anionic polymerization. The at least one terminator can be chosen, for example, from water and alcohols. For example, the at least one terminator can be chosen from water, methanol, ethanol, n-propanol and isopropanol. In some embodiments, isopropanol is the at least one terminator. The amount of the at least one terminator is such that the molar ratio of the at least one terminator to the at least one organic lithium initiator can range from 0.1:1 to −1:1.

Optionally, the copolymer rubber obtained in the preparation process as disclosed herein may be further treated, for example, by adding at least one rubber aging inhibitor into the reaction mixture (i.e., polymer liquid glue) before the drying treatment. For example, conventional rubber aging inhibitors could be used, which can be phenols or amines, including but not limited to Irganox 1520 (CIBA, Switzerland), pentaerythritol tetrakis[3-(3,5-di-tert-butyl-4-hydroxyphenyl) propionate] (i.e., 1010)/tris(2,4-di-t-butylphenyl)phosphite (i.e., 168) composite rubber aging inhibitor (wherein the content of 168 is not higher than 50 wt %), octadecyl 3-(3,5-di-tert-butyl-4-hydroxyphenyl)propionate (i.e., 1076)/tris(2,4-di-t-butylphenyl)phosphite (i.e., 168) composite rubber aging inhibitor (wherein the content of 168 is not higher than 50 wt %), 2,6-di-tert-butyl-p-cresol (abbreviated as rubber aging inhibitor 264), tert-butyl catechol, and 2,2'-methylene-bis(4-methyl-6-tert-butylphenol) (abbreviated as rubber aging inhibitor 2246) etc. The amount of the at least one rubber aging inhibitor ranges, for example, from 0.005% to 2% by weight relative to the total weight of the copolymer rubber. After the addition of at least one rubber aging inhibitor, the polymer liquid glue can be precipitated out from solvent via at least one method chosen from alcoholization precipitation, centrifugal separation, filtration, decantation and hot water agglomeration. Moreover, a stripping method may also be used to remove the volatile organic solvent from the copolymer.

The copolymer rubber as disclosed herein can be used to produce various rubber products, for example, to produce the high performance tires. Further provided herein is a method of making a rubber product, comprising making a rubber product from ingredients comprising the copolymer rubber disclosed herein.

EXAMPLES

The following examples serve to illustrate the disclosure without limiting the scope thereof.

As disclosed herein, the microscopic structure of the synthesized copolymer rubber is determined by using a nuclear magnetic resonance spectrometer AVANCE DRX 400 MHz, Bruker Company, Switzerland, wherein the solvent is chloroform-D.

Molecular weight and coupling efficiency are determined by a gel permeation chromatography (GPC) apparatus of Model ALLIANCE 2690 of WATERS Company in the U.S.A. THF is used as mobile phase; narrow-distributed polystyrene is used for standard samples; and the temperature is 25° C.

The glass transition temperature is determined by the differential scanning calorimetry (DSC) apparatus of Model MDSC2910 of the TA Company in the U.S.A, with a modulation period of 60 s, a modulation amplitude of ±1.5° C., a heating rate of 10° C./min, under nitrogen protection, and a flow rate of 50 mL/min.

The dynamic mechanical properties are determined by a visco-elasticity analyzer of Model DMA-2980 of the TA Company in the U.S.A, with a frequency of 2 Hz, a heating rate of 5° C./min, from −120° C. to 100° C., and a sample size of 40 mm×5 mm×1 mm.

Mooney viscosity is determined by a SHIMADZU SMV-300 tester, Japan, according to the Chinese national standards GB/T1232-92.

The raw rubber is mixed by an open mill at a roll temperature of 50±5° C.

The vulcanization conditions are: a temperature of 145° C., a pressure of at least 10 MPa, and a vulcanization time of 35 min.

The basic formulation for vulcanization: raw rubber 100 g; sulfur 1.75 g; stearic acid 1 g; industrial 7# reference carbon black 50 g; accelerator 1 g; zinc oxide 3 g.

The physical properties of the vulcanized rubber are determined by a Model SHIMADZU AG-20KNG stretcher, Japan, according to the Chinese national standards GB/T528-1998.

Example 1

Into a 5 L stainless steel stirring kettle under the protection of highly pure nitrogen, were added 2288 g cyclohexane, 62.4 g styrene, 124.8 g isoprene, and 112.32 g butadiene, and then, ethyl tetrahydrofurfuryl ether and sodium dodecylbenzenesulfonate, wherein ethyl tetrahydrofurfuryl ether/initiator (mol/mol)=0.8:1, and sodium dodecylbenzenesulfonate/initiator (n-butyl lithium) (mol/mol)=0.1:1. At 50° C., 3.69 mmol n-butyl lithium was added to initiate the reaction. After the completion of polymerization, at a polymerization temperature of 91.1° C., an additional 12.48 g butadiene was added to continue the polymerization, and the reaction lasted for 20 min. Then 0.39 mmol tin tetrachloride was further added into the polymerization kettle. After 70 min, the reaction was terminated by the addition of 0.5 g isopropanol. The resulting liquid glue was treated with a 0.62 g rubber aging inhibitor Irganox 1520, agglomerated with hot water, and dried by hot rollers. The sample was tested as to physical properties, and the results are shown in Table 1.

Example 2

Into a 5 L stainless steel stirring kettle, under the protection of highly pure nitrogen, were added 2288 g cyclohexane, 62.4 g styrene, 124.8 g isoprene, and 99.84 g butadiene, and then, ethyl tetrahydrofurfuryl ether and sodium dodecylbenzenesulfonate, wherein ethyl tetrahydrofurfuryl ether/initiator (n-butyl lithium) (mol/mol)=0.8:1, and sodium dodecylbenzenesulfonate/initiator (n-butyl lithium) (mol/mol)=0.1:1. At 50° C., 3.59 mmol n-butyl lithium was added to initiate the reaction. After the completion of polymerization, at a polymerization temperature of 85.2° C., an additional 24.96 g butadiene was added to continue the polymerization, and the reaction lasted for 20 min. Then 0.37 mmol tin tetrachloride was further added into the polymerization kettle. After 70 min, the reaction was terminated by the addition of 0.5 g isopropanol. The resulting liquid glue was treated with a 0.62 g rubber aging inhibitor Irganox 1520, agglomerated with hot water, and dried by hot rollers. The sample was tested as to physical properties, and the results are shown in Table 1.

Example 3

Into a 5 L stainless steel stirring kettle, under the protection of highly pure nitrogen, were added 2288 g cyclohexane, 62.4 g styrene, 124.8 g isoprene, and 87.36 g butadiene, and then, ethyl tetrahydrofurfuryl ether and sodium dodecylbenzenesulfonate, wherein ethyl tetrahydrofurfuryl ether/initiator (n-butyl lithium) (mol/mol)=0.8:1, and sodium dodecylbenzenesulfonate/initiator (n-butyl lithium) (mol/mol)=0.1:1. At 50° C., 3.03 mmol n-butyl lithium was added to initiate the reaction. After the completion of polymerization, at a polymerization temperature of 87.4° C., an additional 37.44 g butadiene was added to continue the polymerization, and the reaction lasted for 20 min. Then 0.26 mmol tin tetrachloride was further added into the polymerization kettle. After 70 min, the reaction was terminated by the addition of 0.5 g isopropanol. The resulting liquid glue was treated with a 0.62 g rubber aging inhibitor Irganox 1520, agglomerated with hot water, and dried by hot rollers. The sample was tested as to physical properties, and the results are shown in Table 1.

Example 4

Into a 5 L stainless steel stirring kettle, under the protection of highly pure nitrogen, were added 2288 g cyclohexane, 62.4 g styrene, 124.8 g isoprene, and 74.88 g butadiene, and then, ethyl tetrahydrofurfuryl ether and sodium dodecylbenzenesulfonate, wherein ethyl tetrahydrofurfuryl ether/initiator (n-butyl lithium) (mol/mol)=0.8:1, and sodium dodecylbenzenesulfonate/initiator (n-butyl lithium) (mol/mol)=0.1:1. At 50° C., 3.42 mmol n-butyl lithium was added to initiate the reaction. After the completion of polymerization, at a polymerization temperature of 88.6° C., an additional 49.92 g butadiene was added to continue the polymerization, and the reaction lasted for 20 min. Then 0.34 mmol tin tetrachloride was further added into the polymerization kettle. After 70 min, the reaction was terminated by the addition of 0.5 g isopropanol. The resulting liquid glue was treated with a 0.62 g rubber aging inhibitor Irganox 1520, agglomerated with hot water, and dried by hot rollers. The sample was tested as to physical properties, and the results are shown in Table 1.

Example 5

Into a 5 L stainless steel stirring kettle, under the protection of highly pure nitrogen, were added 2288 g cyclohexane, 62.4 g styrene, 124.8 g isoprene, and 62.4 g butadiene, and then, ethyl tetrahydrofurfuryl ether and sodium dodecylbenzenesulfonate, wherein ethyl tetrahydrofurfuryl ether/initiator (n-butyl lithium) (mol/mol)=0.8:1, and sodium dodecylbenzenesulfonate/initiator (n-butyl lithium) (mol/mol)=0.1:1. At 50° C., 3.76 mmol n-butyl lithium was added to initiate the reaction. After the completion of polymerization, at a polymerization temperature of 77.3° C., an additional 62.4 g butadiene was added to continue the polymerization, and the reaction lasted for 20 min. Then 0.41 mmol tin tetrachloride was further added into the polymerization kettle. After 70 min, the reaction was terminated by the addition of 0.5 g isopropanol. The resulting liquid glue was treated with a 0.62 g rubber aging inhibitor Irganox 1520, agglomerated with hot water, and dried by hot rollers. The sample was tested as to physical properties, and the results are shown in Table 1.

Example 6

Into a 5 L stainless steel stirring kettle, under the protection of highly pure nitrogen, were added 2288 g cyclohexane, 62.4 g styrene, 124.8 g isoprene, and 49.92 g butadiene, and then, ethyl tetrahydrofurfuryl ether and sodium dodecylbenzenesulfonate, wherein ethyl tetrahydrofurfuryl ether/initiator (n-butyl lithium) (mol/mol)=0.8:1, and sodium dodecylbenzenesulfonate/initiator (n-butyl lithium) (mol/mol)=0.1:1. At 50° C., 3.5 mmol n-butyl lithium was added to initiate the reaction. After the completion of polymerization, at a polymerization temperature of 72.8° C., an additional 74.88 g butadiene was added to continue the polymerization, and the reaction lasted for 20 min. Then 0.35 mmol tin tetrachloride was further added into the polymerization kettle. After 70 min, the reaction was terminated by the addition of 0.5 g isopropanol. The resulting liquid glue was treated with a 0.62 g rubber aging inhibitor Irganox 1520, agglomerated with hot water, and dried by hot rollers. The sample was tested as to physical properties, and the results are shown in Table 1.

Example 7

Into a 5 L stainless steel stirring kettle, under the protection of highly pure nitrogen, were added 2288 g cyclohexane, 62.4 g styrene, 124.8 g isoprene, and 37.44 g butadiene, and then, ethyl tetrahydrofurfuryl ether and sodium dodecylbenzenesulfonate, wherein ethyl tetrahydrofurfuryl ether/initiator (n-butyl lithium) (mol/mol)=0.8:1, and sodium dodecylbenzenesulfonate/initiator (n-butyl lithium) (mol/mol)=0.1:1. At 50° C., 3.6 mmol n-butyl lithium was added to initiate the reaction. After the completion of polymerization, at a polymerization temperature of 77.1° C., an additional 87.36 g butadiene was added to continue the polymerization, and the reaction lasted for 20 min. Then 0.37 mmol tin tetrachloride was further added into the polymerization kettle. After 70 min, the reaction was terminated by the addition of 0.5 g isopropanol. The resulting liquid glue was treated with a 0.62 g rubber aging inhibitor Irganox 1520, agglomerated with hot water, and dried by hot rollers. The sample was tested as to physical properties, and the results are shown in Table 1.

Example 8

Into a 5 L stainless steel stirring kettle, under the protection of highly pure nitrogen, were added 2288 g cyclohexane, 62.4 g styrene, 124.8 g isoprene, and 24.96 g butadiene, and then, ethyl tetrahydrofurfuryl ether and sodium dodecylbenzenesulfonate, wherein ethyl tetrahydrofurfuryl ether/initiator (n-butyl lithium) (mol/mol)=0.8:1, and sodium dodecylbenzenesulfonate/initiator (n-butyl lithium) (mol/mol)=0.1:1. At 50° C., 3.3 mmol n-butyl lithium was added to initiate the reaction. After the completion of polymerization, at a polymerization temperature of 70.1° C., an additional 99.84 g butadiene was added to continue the polymerization, and the reaction lasted for 20 min. Then 0.31 mmol tin tetrachloride was further added into the polymerization kettle. After 70 min, the reaction was terminated by the addition of 0.5 g isopropanol. The resulting liquid glue was treated with a 0.62 g rubber aging inhibitor Irganox 1520, agglomerated with hot water, and dried by hot rollers. The sample was tested as to physical properties, and the results are shown in Table 1.

Example 9

Into a 5 L stainless steel stirring kettle, under the protection of highly pure nitrogen, were added 2288 g cyclohexane, 62.4 g styrene, 124.8 g isoprene, and 12.48 g butadiene, and then, ethyl tetrahydrofurfuryl ether and sodium dodecylbenzenesulfonate, wherein ethyl tetrahydrofurfuryl ether/initiator (n-butyl lithium) (mol/mol)=0.8:1, and sodium dodecylbenzenesulfonate/initiator (n-butyl lithium) (mol/mol)=0.1:1. At 50° C., 3.61 mmol n-butyl lithium was added to initiate the reaction. After the completion of polymerization, at a polymerization temperature of 70.8° C., an additional 112.32 g butadiene was supplemented to continue the polymerization, and the reaction lasted for 20 min. Then 0.38 mmol tin tetrachloride was further added into the polymerization kettle. After 70 min, the reaction was terminated by the addition of 0.5 g isopropanol. The resulting liquid glue was treated with a 0.62 g rubber aging inhibitor Irganox 1520, agglomerated with hot water, and dried by hot rollers. The sample was tested as to physical properties, and the results are shown in Table 1.

Example 10

The polymerization process was identical to that of Example 4, except that butadiene and isoprene were interchanged for each other for use in terms of charging manner and charging amount. The sample was tested as to physical mechanical properties, and the results are shown in Table 1.

Example 11

The polymerization process was identical to that of Example 5, except that butadiene and isoprene were interchanged for each other for use in terms of charging manner and charging amount. The sample was tested as to physical mechanical properties, and the results are shown in Table 1.

Example 12

The polymerization process was identical to that of Example 6, except that butadiene and isoprene were interchanged for each other for use in terms of charging manner and charging amount. The sample was tested as to physical mechanical properties, and the results are shown in Table 1.

Example 13

The polymerization process was identical to that of Example 7, except that butadiene and isoprene were interchanged for each other for use in terms of charging manner and charging amount. The sample was tested as to physical mechanical properties, and the results are shown in Table 1.

TABLE 1

Polymerization Process Conditions and Product Physical Properties

| Items | Example No. 1 | 2 | 3 | 4 | 5 | 6 | 7 |
|---|---|---|---|---|---|---|---|
| solvent/g | 2288 | 2288 | 2288 | 2288 | 2288 | 2288 | 2288 |
| ST/g | 62.4 | 62.4 | 62.4 | 62.4 | 62.4 | 62.4 | 62.4 |
| BD(1)/g | 112.32 | 99.84 | 87.36 | 74.88 | 62.4 | 49.92 | 37.44 |
| IP(1)/g | — | — | — | — | — | — | — |
| IP/g | 124.8 | 124.8 | 124.8 | 124.8 | 124.8 | 124.8 | 124.8 |
| BD/g | — | — | — | — | — | — | — |
| BD(2)/g | 12.48 | 24.96 | 37.44 | 49.92 | 62.4 | 74.88 | 87.36 |
| IP(2)/g | — | — | — | — | — | — | — |
| BD(1)/BD(2) | 9/1 | 8/2 | 7/3 | 6/4 | 5/5 | 4/6 | 3/7 |
| IP(1)/IP(2) | — | — | — | — | — | — | — |
| Initiation temperature/°C. | 50 | 50 | 50 | 50 | 50 | 50 | 50 |
| Charging temperature of the second stage/°C. | 91.1 | 85.2 | 87.4 | 88.6 | 77.3 | 72.8 | 77.1 |
| $M_{peak}/10^4$ | 15.9 | 16.8 | 24.0 | 18.5 | 15.4 | 17.6 | 16.7 |
| Coupling efficiency/% | 51 | 51.23 | 31 | 42.4 | 48.0 | 56 | 50.4 |
| Mooney viscosity | 50 | 45 | 73.8 | 65.1 | 42 | 56 | 46 |
| Shore hardness | 74 | 72 | 72 | 72 | 76 | 74 | 76 |
| Tear strength/MPa | 33 | 34 | 31 | 31 | 32 | 31 | 32 |
| Tensile strength/MPa | 20.9 | 22.2 | 20.9 | 21.6 | 20.7 | 21.4 | 20.2 |
| Modulus at 300%/MPa | 16.2 | 17.9 | 17.8 | 16.7 | 18.3 | 19.3 | 17.6 |
| permanent set/% | 9 | 10 | 8 | 10 | 9 | 8 | 6 |
| Elongation at break/% | 371 | 363 | 342 | 369 | 335 | 329 | 327 |
| Non-blocked ST/wt % | 22.1 | 20.2 | 21.9 | 19.9 | 22.3 | 20.3 | 21.4 |
| microblocked ST/wt % | 0.5 | 0.9 | 0.2 | 0.1 | 0.2 | 0.0 | 0.5 |
| 1,2-BD/wt % | 12.2 | 12.3 | 12.9 | 11.9 | 12.8 | 15.0 | 13.0 |
| 1,4-BD/wt % | 27.3 | 27.7 | 26.3 | 26.7 | 28.4 | 28.4 | 29.9 |
| 1,4-IP/wt % | 26.2 | 26.2 | 24.7 | 28.0 | 22.3 | 21.4 | 23.2 |
| 3,4-IP/wt % | 11.7 | 12.6 | 139 | 13.3 | 12.4 | 14.9 | 12.0 |
| Tanδ 0° C. | 0.2451 | 0.2404 | 0.2814 | 0.2683 | 0.2496 | 0.2941 | 0.2478 |
| Tanδ 60° C. | 0.09987 | 0.1026 | 0.09296 | 0.09054 | 0.1116 | 0.09457 | 0.09739 |
| Tg/°C. | −45.93 | −43.42 | −42.46 | −45.53 | −43.79 | −42.38 | −46.16 |

Polymerization Process Conditions and Product Physical Properties

| Items | Example No. 8 | 9 | 10 | 11 | 12 | 13 |
|---|---|---|---|---|---|---|
| solvent/g | 2288 | 2288 | 2288 | 2288 | 2288 | 2288 |
| ST/g | 62.4 | 62.4 | 62.4 | 62.4 | 62.4 | 62.4 |
| BD(1)/g | 24.96 | 12.48 | — | — | — | — |
| IP(1)/g | — | — | 74.88 | 62.4 | 49.92 | 37.44 |
| IP/g | 124.8 | 124.8 | — | — | — | — |
| BD/g | — | — | 124.8 | 124.8 | 124.8 | 124.8 |
| BD(2)/g | 99.84 | 112.32 | — | — | — | — |
| IP(2)/g | — | — | 49.92 | 62.4 | 74.88 | 87.36 |
| BD(1)/BD(2) | 2/8 | 1/9 | — | — | — | — |
| IP(1)/IP(2) | — | — | 6/4 | 5/5 | 4/6 | 3/7 |

TABLE 1-continued

| | | | | | | |
|---|---|---|---|---|---|---|
| Initiation temperature/° C. | 50 | 50 | 50 | 50 | 50 | 50 |
| Charging temperature of the second stage/° C. | 70.1 | 70.8 | 83.7 | 81.0 | 80 | 80.5 |
| $M_{peak}/10^4$ | 19.9 | 16.6 | 14.8 | 23.8 | 18.7 | 20.0 |
| Coupling efficiency/% | 60 | 53 | 58 | 38 | 51.4 | 53.2 |
| Mooney viscosity | 75 | 47 | 56 | 49 | 58 | 76 |
| Shore hardness | 76 | 76 | 72 | 70 | 70 | 70 |
| Tear strength/MPa | 31 | 30 | 36 | 39 | 34 | 35 |
| Tensile strength/MPa | 22.9 | 22.4 | 20.3 | 19.6 | 18.4 | 18.9 |
| Modulus at 300%/MPa | 18.3 | 20.5 | 11.7 | 11.2 | 11.3 | 10.9 |
| permanent set/% | 7 | 7 | 12 | 13 | 12 | 10 |
| Elongation at break/% | 363 | 325 | 374 | 431 | 386 | 416 |
| Non-blocked ST/wt % | 21.8 | 22.8 | 23.4 | 21.2 | 22.3 | 23.0 |
| microblocked ST/wt % | 0.1 | 0.3 | 0.1 | 0.0 | 0.1 | 0.1 |
| 1,2-BD/wt % | 15.0 | 14.5 | 15.4 | 15.3 | 15.3 | 16.2 |
| 1,4-BD/wt % | 28.1 | 26.6 | 22.7 | 22.9 | 23.9 | 23.9 |
| 1,4-IP/wt % | 21.0 | 22.3 | 21.5 | 24.1 | 23.1 | 19.9 |
| 3,4-IP/wt % | 13.9 | 13.5 | 16.9 | 16.5 | 15.3 | 16.9 |
| Tanδ 0° C. | 0.3180 | 0.3216 | 0.5123 | 0.4136 | 0.3997 | 0.4862 |
| Tanδ 60° C. | 0.09374 | 0.09745 | 0.1186 | 0.1197 | 0.1183 | 0.1131 |
| Tg/° C. | −43.03 | −44.75 | −41.00 | −41.70 | −41.30 | −43.42 |

It can be seen from the data of Table 1: as the weight ratio of BD(1)/BD(2) increases from 1/9 to 9/1, the styrene microblock content in the copolymer rubber can be controlled to be not more than 1% by weight relative to the total weight of the copolymer rubber, which may be a reason leading to relatively good dynamic mechanical properties. Besides, the 1,2-BD (butadiene by 1,2-butadiene linkage) content and 3,4-IP (isoprene by 3,4-isoprene linkage) content in the copolymer rubber may be influenced by the ratio of BD(1)/BD(2) and/or the charging temperature of the second stage. Indeed, the data of Table 1 roughly indicate that the greater the ratio of BD(1)/BD(2) is, and the lower the charging temperature of the second stage is, the higher is the 1,2-BD content and 3,4-IP content in the resulting polymers, and this in turn would affect the glass transition temperature and dynamic mechanical properties of the copolymer rubber. Accordingly, samples having suitable glass transition temperatures and excellent dynamic mechanical properties could be obtained, for example, through the mutual adjustment of the ratio of BD(1)/BD(2) and the charging temperature of the second stage. Moreover, the copolymer rubbers for which isoprene is used for polymerization in the second stage could also have excellent comprehensive performance; the styrene microblock content could be better controlled (not more than 1 wt %); and meanwhile, Tanδ at 0° C. is greater than 0.24 and Tanδ at 60° C. is less than 0.12. Those Tanδ values at 0° C. and 60° C. seemingly provide better balance between wet skid resistance and rolling resistance.

What is claimed is:

1. A copolymer rubber, comprising a copolymer having a star-shaped block structure $(SIB-PA)_n-X$, and further comprising a copolymer having a SIB-PA structure, wherein:
    SIB is a block comprising styrene, butadiene, and isoprene as constituent monomers;
    PA is a block formed by homopolymerization of butadiene or isoprene;
    X is the residue of at least one coupling agent; and
    n=2-4,
    wherein the content of isoprene ranges from 20 to 60% by weight relative to the total weight of the copolymer rubber.

2. The copolymer rubber according to claim 1, wherein the content of butadiene ranges from 20 to 60% by weight relative to the total weight of the copolymer rubber.

3. The copolymer rubber according to claim 1, wherein the content of styrene ranges from 10 to 40% by weight relative to the total weight of the copolymer rubber.

4. The copolymer rubber according to claim 3, wherein the content of styrene ranges from 15 to 25% by weight relative to the total weight of the copolymer rubber.

5. The copolymer rubber according to claim 1, wherein the structure SIB-PA, before being coupled to the at least one coupling agent, has a number average molecular weight ranging from 100,000 to 500,000, and a polydispersity index ranging from 1.1 to 2.5.

6. The copolymer rubber according to claim 5, wherein the structure SIB-PA, before being coupled to the at least one coupling agent, has a number average molecular weight ranging from 120,000 to 250,000.

7. The copolymer rubber according to claim 1, wherein the SIB is a block formed by random copolymerization of styrene, butadiene, and isoprene.

8. The copolymer rubber according to claim 1, wherein the content of isoprene by 1,4-isoprene linkage ranges from 10 to 40% by weight relative to the total weight of the copolymer rubber; and the content of isoprene by 3,4-isoprene linkage ranges from 5 to 30% by weight relative to the total weight of the copolymer rubber.

9. The copolymer rubber according to claim 1, wherein the content of butadiene by 1,2-butadiene linkage ranges from 5 to 30% by weight relative to the total weight of the copolymer rubber; and the content of butadiene by 1,4-butadiene linkage ranges from 10 to 40% by weight relative to the total weight of the copolymer rubber.

10. The copolymer rubber according to claim 1, wherein the content of butadiene or isoprene in the SIB block ranges from 6 to 40% by weight relative to the total weight of the copolymer rubber.

11. The copolymer rubber according to claim 1, wherein said SIB block contains at least one styrene microblock with a number of repeating styrene units ranging from 3 to 5 and further wherein the content of styrene microblock is equal to or less than 1% by weight, relative to the total weight of the copolymer rubber.

12. The copolymer rubber according to claim 1, wherein the copolymer rubber has a glass transition temperature (Tg) ranging from −30 to −80° C.

13. The copolymer rubber according to claim 1, wherein the copolymer rubber has a tan δ value of equal to or less than 0.12 at 60° C., and a tan δ value of equal to or larger than 0.24 at 0° C.

\* \* \* \* \*